United States Patent
Zhilun et al.

(10) Patent No.: US 9,419,531 B2
(45) Date of Patent: Aug. 16, 2016

(54) FORWARD-FLYBACK DC-DC CONVERTER USING RESONANT LC OUTPUT CIRCUIT

(75) Inventors: Hu Zhilun, Shenzhen (CN); Yilei Gu, Shenzhen (CN); Zhiwei Wen, Shenzhen (CN); Changdan Zhang, Shenzhen (CN)

(73) Assignee: SANTAK ELECTRONIC (SHENZHEN) CO., LTD. (CN)

( * ) Notice: Subject to any disclaimer, the term of this patent is extended or adjusted under 35 U.S.C. 154(b) by 62 days.

(21) Appl. No.: 14/233,675

(22) PCT Filed: Jul. 23, 2012

(86) PCT No.: PCT/CN2012/079030
§ 371 (c)(1),
(2), (4) Date: Apr. 28, 2014

(87) PCT Pub. No.: WO2013/010510
PCT Pub. Date: Jan. 24, 2013

(65) Prior Publication Data
US 2014/0226367 A1    Aug. 14, 2014

(30) Foreign Application Priority Data
Jul. 21, 2011  (CN) .......................... 2011 1 0205472

(51) Int. Cl.
*H02M 3/335*    (2006.01)
*H02M 1/00*    (2006.01)

(52) U.S. Cl.
CPC ........ *H02M 3/3353* (2013.01); *H02M 3/33507* (2013.01); *H02M 3/33523* (2013.01);
(Continued)

(58) Field of Classification Search
CPC .................... H02M 3/33507; H02M 3/33523; H02M 3/33538; H02M 3/33553; H02M 3/33569
See application file for complete search history.

(56) References Cited

U.S. PATENT DOCUMENTS

| 4,092,509 A * | 5/1978 | Mitchell ................. H02M 5/27 219/625 |
| 4,209,826 A * | 6/1980 | Priegnitz .............. H02H 7/1213 323/285 |

(Continued)

FOREIGN PATENT DOCUMENTS

| CN | 1132297 C | 12/2003 |
| CN | 2764050 Y | 3/2006 |

(Continued)

OTHER PUBLICATIONS

English Translation of International Preliminary Report on Patentability corresponding to International Application No. PCT/CN2012/079030, Date of mailing: Jan. 21, 2014, 6 pages.

(Continued)

*Primary Examiner* — Timothy J Dole
*Assistant Examiner* — Ishrat Jamali
(74) *Attorney, Agent, or Firm* — Myers Bigel & Sibley, P.A.

(57) ABSTRACT

A forward-flyback DC-DC converter topology includes a transformer, a main switch, a clamp circuit, first and second rectifying switches, an LC resonant circuit and an output capacitor; a primary winding of the transformer and the main switch are connected in series between a first input terminal and a second input terminal, the clamp circuit constituted by a clamp capacitor and a clamp switch connected in series is connected in parallel with the primary winding or with the main switch, a secondary winding of the transformer includes a forward winding and a flyback winding, a terminal of the primary winding through which current flows into is a dotted terminal of the primary winding, and a connecting mode of a secondary side of the transformer is: the dotted terminal of the forward winding being connected with a first output terminal via the first rectifying switch, a dotted terminal of the flyback winding being connected with a second output terminal via the second rectifying switch, the LC resonant circuit being connected with the first and the second output terminals and an unlike terminal of the forward winding and the flyback winding so that the first and the second rectifying switches implement zero-current switching, and the output capacitor being connected between the first and the second output terminals.

15 Claims, 5 Drawing Sheets

(52) U.S. Cl.
CPC ...... *H02M3/33538* (2013.01); *H02M 3/33553* (2013.01); *H02M 3/33569* (2013.01); *H02M 2001/0058* (2013.01); *Y02B 70/1433* (2013.01); *Y02B 70/1491* (2013.01)

(56) References Cited

U.S. PATENT DOCUMENTS

| | | | | |
|---|---|---|---|---|
| 4,253,137 | A * | 2/1981 | Rao ............................... | 363/21.1 |
| 6,317,341 | B1 * | 11/2001 | Fraidlin et al. ............. | 363/56.09 |
| 6,646,895 | B1 * | 11/2003 | Jacobs et al. ............... | 363/21.08 |
| 7,061,778 | B2 | 6/2006 | Odell et al. | |
| 7,184,280 | B2 * | 2/2007 | Sun ................... | H02M 3/33592 363/127 |
| 7,184,287 | B2 * | 2/2007 | Ying et al. .................... | 363/126 |
| 7,876,159 | B2 * | 1/2011 | Wang .................... | H03F 1/0288 330/124 R |
| 8,040,696 | B2 * | 10/2011 | Wu .................... | H02M 3/33592 363/127 |
| 2003/0067791 | A1 * | 4/2003 | Elferich et al. ................. | 363/16 |
| 2005/0088854 | A1 * | 4/2005 | Ramabhadran et al. ........ | 363/16 |
| 2006/0193155 | A1 * | 8/2006 | Aso et al. ................... | 363/56.01 |
| 2009/0244933 | A1 * | 10/2009 | Wang ............... | H02M 3/33592 363/21.06 |
| 2010/0067259 | A1 * | 3/2010 | Liu ............................ | 363/21.01 |

FOREIGN PATENT DOCUMENTS

| | | |
|---|---|---|
| CN | 2917083 Y | 6/2007 |
| CN | 100514817 C | 7/2009 |
| JP | 2000308347 | 11/2000 |
| TW | 201014140 | 4/2010 |

OTHER PUBLICATIONS

International Preliminary Report on Patentability corresponding to International Application No. PCT/CN2012/079030, Date of mailing: Jan. 21, 2014, 5 pages.
English Translation of the International Search Report corresponding to International Application No. PCT/CN2012/079030, Date of mailing: Nov. 8, 2012, 3 pages.
International Search Report corresponding to International Application No. PCT/CN2012/079030, Date of mailing: Nov. 8, 2012, 5 pages.
Written Opinion of the International Searching Authority corresponding to International Application No. PCT/CN2012/079030, Date of mailing: Aug. 11, 2012; 4 pages.
English Translation of the Written Opinion of the International Searching Authority corresponding to International Application No. PCT/CN2012/079030, Date of mailing: Aug. 11, 2012; 5 pages.
Chinese Search Report corresponding to CN Application No. 2011102054727, Date of mailing: Apr. 26, 2016, 2 pages.

* cited by examiner

PRIOR ART

FORWARD-FLYBACK DC-DC CONVERTER USING RESONANT LC OUTPUT CIRCUIT

TECHNICAL FIELD

The present invention relates to the field of switching power supply, more particularly, to a direct current-direct current (DC-DC) converter.

BACKGROUND

The DC-DC converter has been commercialized and widely used in UPS systems, battery charge and discharge devices, electric vehicles, starter/generator systems, aeronautics and space power systems, remote and data communication systems, computer equipment, office automation equipment, industrial instruments and meters, and other occasions. Varying with the operating mode, DC-DC converters can be divided into topological structures such as step-down, step-up, step-down/step-up, flyback, forward, half-bridge, full-bridge, push-pull, etc. With increasing requirement for the switching power supply performance, it is necessary to develop a new circuit topological structure to implement a high-efficiency DC-DC converter.

Due to the advantages such as low cost and wide range of input voltage, an active-clamped flyback DC-DC converter is usually applied in the "Super Charger" included in the UPS system for charging the external battery. The topological structure of the active-clamped flyback DC-DC converter in the prior art is for example shown in FIG. 1. The disadvantage of such converter topology rests with difficulty to meet the requirement of high efficiency (for example, an efficiency of above 94%).

For the need to improve the efficiency of the converter, Patent Document 1 (CN 101692595 A) proposes a forward-flyback DC-DC converter topological structure, which is shown in the schematic diagram of FIG. 2.

In order to implement the high-efficiency DC-DC converter at low cost, there is still room for further improving the circuit topological structure.

SUMMARY

The present invention is developed to solve the problem mentioned above. With the forward-flyback DC-DC converter topology of the present invention, an even higher efficiency can be implemented at the cost approximate to that of the topology in Patent Document 1.

According to one embodiment of the present invention, a forward-flyback DC-DC converter topology includes a transformer, a main switch, a clamp circuit, first and second rectifying switches, an LC resonant circuit and an output capacitor. A primary winding of the transformer and the main switch are connected in series between a first input terminal and a second input terminal. The clamp circuit constituted by a clamp capacitor and a clamp switch connected in series is connected in parallel with the primary winding or the main switch. A secondary winding of the transformer includes a forward winding and a flyback winding. A terminal of the primary winding through which current flows into is a dotted terminal of the primary winding, and a connecting mode of a secondary side of the transformer is: the dotted terminal of the forward winding being connected with a first output terminal via the first rectifying switch, a dotted terminal of the flyback winding being connected with a second output terminal via the second rectifying switch, the LC resonant circuit being connected with the first output terminal, the second output terminal and an unlike terminal of the forward winding and the flyback winding so that the first and second rectifying switches implement zero-current switching, and the output capacitor being connected between the first output terminal and the second output terminal.

Preferably, the LC resonant circuit includes a first capacitor, a second capacitor and a resonant inductor. The first capacitor and the second capacitor are connected in series between the first output terminal and the second output terminal, one terminal of the resonant inductor is connected to the unlike terminal of the forward winding and the flyback winding, and the other terminal thereof is connected to an intermediate node of the first capacitor and the second capacitor Preferably, the LC resonant circuit includes a first inductor, a second inductor, the first capacitor and the second capacitor. The first inductor and the first capacitor are connected in series between the first output terminal and the unlike terminal of the forward winding and the flyback winding, and the second inductor and the second capacitor are connected in series between the second output terminal and the unlike terminal of the forward winding and the flyback winding.

Preferably, the LC resonant circuit includes the first inductor, the second inductor, the first capacitor and the second capacitor. The first inductor is connected between the first rectifying switch and the first output terminal, the second inductor is connected between the second rectifying switch and the second output terminal, the first capacitor and the second capacitor are connected in series between the first output terminal and the second output terminal, and the unlike terminal of the forward winding and the flyback winding is connected to the intermediate node of the first capacitor and the second capacitor.

Preferably, a turns ratio between the forward winding and the flyback winding is 1:1.

Preferably, on condition that a DC-DC power transmission of the converter in a forward working state is greater than a DC-DC power transmission in a flyback working state, the number of turns of the flyback winding is made greater than the number of turns of the forward winding. On the contrary, on condition that the DC-DC power transmission of the converter in the flyback working state is greater than the DC-DC power transmission in the forward working state, the number of turns of the forward winding is made greater than the number of turns of the flyback winding.

Preferably, the rectifying switch is a diode or a MOSFET.

Preferably, the transformer has a leakage inductance.

Preferably, when entering the forward working state with the main switch on and the clamp switch off, the first rectifying switch is on, the second rectifying switch is off, the LC resonant circuit begins to resonate; before the main switch is switched off, resonance current flowing through the LC resonant circuit is made to zero so as to implement the zero-current switching of the first rectifying switch. When entering the flyback working state with the main switch off and the clamp switch on, the first rectifying switch is off, the second rectifying switch is on, the LC resonant circuit begins to resonate; before the main switch is switched on, the resonance current flowing through the LC resonant circuit is made to zero so as to implement the zero-current switching of the second rectifying switch.

Preferably, when the main switch is off, the clamp capacitor and the leakage inductance of the transformer begin to resonate, so that the main switch and the clamp switch obtain zero-voltage switching, energy of the leakage inductance of the transformer is transferred to the secondary side via resonance, so as to avoid energy loss of the leakage inductance of the transformer and instantly-caused voltage spike on the main switch.

BRIEF DESCRIPTION OF THE DRAWINGS

The accompanying drawings which are incorporated in and constitute part of this description, show the embodiments of the present invention, and with the above-given general description and the following detailed description of the embodiments of the present invention, are used to illustrate the principle of the present invention. In the accompanying drawings.

DETAILED DESCRIPTION

The preferable embodiments according to the present invention are described below with reference to the accompanying drawings, in which like reference signs indicate like components, and therefore detailed description thereof will not be repeated, wherein "U" and "V" are both signs representing voltage, which are not used distinctively hereinafter.

Figure 3:
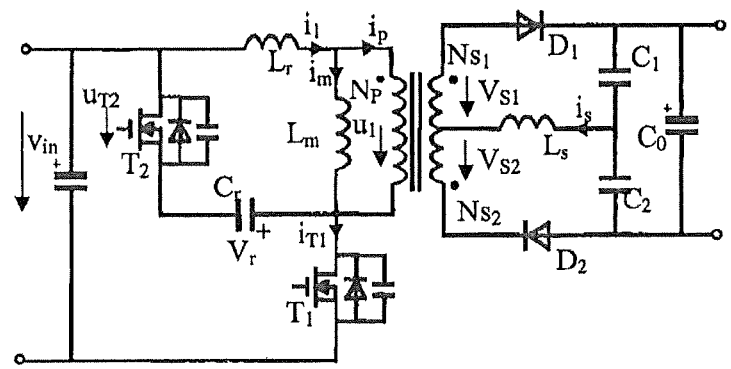
FIG. 3 shows an equivalent circuit diagram of the active-clamped forward-flyback DC-DC converter topology according to one embodiment of the present invention.

FIG. 3 shows an equivalent circuit diagram of the active-clamped forward-flyback DC-DC converter topology according to one embodiment of the present invention. In FIG. 3, Lr and Lm represent leakage inductance and magnetizing inductance separated from a practical transformer equivalent model, respectively, the transformer being an ideal transformer. It can be seen from FIG. 3 that the DC-DC converter topology according to the embodiment includes a high-frequency transformer, a main switch transistor T1, an active clamp circuit, rectifying diodes D1 and D2, a resonant circuit and an output capacitor C0.

It can be seen from FIG. 3 that the primary-side structure of the transformer including the active clamp circuit is the same as that in the prior art, i.e., the primary winding of the transformer (represented by Np in FIG. 3) and the main switch transistor T1 are connected in series between a first input terminal and a second input terminal. The clamp circuit constituted by a clamp capacitor Cr and a clamp switch transistor T2 connected in series is connected to the primary winding Np in parallel. The clamp capacitor Cr resonates with a leakage inductance Lr when the main switch transistor T1 is off, so that the main switch transistor T1 and the clamp switch transistor T2 obtain zero-voltage switching, and the energy of the leakage inductance Lr is transferred to the secondary side via resonance, so as to avoid energy loss of the leakage inductance Lr and instantly-caused voltage spike on the main switch transistor T1.

Alternatively, the clamp circuit constituted by the clamp capacitor Cr and the clamp switch transistor T2 connected in series may be connected with the main switch transistor T1 in parallel, other than connected with the primary winding Np in parallel.

It can be seen from FIG. 3 that in addition to the rectifying circuit and a filter circuit, the secondary side of the transformer also includes a resonant circuit, which is constituted by a resonant inductor Ls, a first capacitor C1 and a second capacitor C2, for implementing zero-current switching of the rectifying diodes D1 and D2. As shown in FIG. 3, the secondary winding of the transformer includes a winding where current flows in the forward working state (briefly referred to as "forward winding", represented by Ns1 in FIG. 3) and a winding where current flows in the flyback working state (briefly referred to as "flyback winding", represented by Ns2 in FIG. 3). A terminal of the primary winding Np through which current flows into is a dotted terminal of the primary winding Np, thus, a connecting mode of the secondary side of the transformer is: the dotted terminal of the forward winding Ns1 being connected with a first output terminal via the first rectifying diode D1, the dotted terminal of the flyback winding Ns2 being connected with a second output terminal via the second rectifying diode D2, the first capacitor C1 and the second capacitor C2 being connected in series between the first output terminal and the second output terminal, one terminal of the resonant inductor Ls being connected with an unlike terminal of the forward winding Ns1 and the flyback winding Ns2, and the other terminal thereof being connected to an intermediate node of the first capacitor C1 and the second capacitor C2, the output capacitor C0 being connected between the first output terminal and the second output terminal.

Although the secondary-side rectifying switch as shown in FIG. 3 is a diode, those skilled in the art may conceive that a MOSFET or like switching element may be used as the secondary-side rectifying switch and the switch timing thereof may be appropriately controlled. FIGS. 4(a)-(d) show a set of exemplary active-clamped forward-flyback DC-DC converter topological structures according to the embodiment of the present invention, wherein FIGS. 4(c) and 4(d) show the case where the clamp circuit and the main switch transistor T1 are connected in parallel, and FIGS. 4(b) and 4(d) show the case where the MOSFET is used as a rectifying switch.

Figure 5:
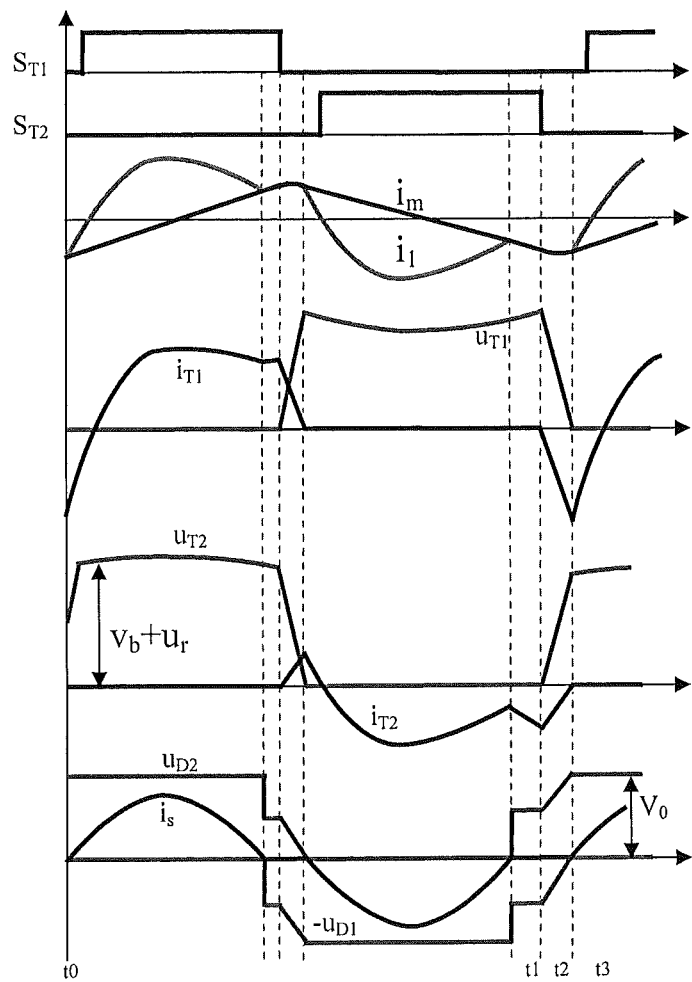
FIG. 5 shows operating waveforms of the active-clamped forward-flyback DC-DC converter topological structures according to the embodiment of the present invention.

FIG. 5 shows signal waveforms of the forward-flyback DC-DC converter in operation according to the embodiment of the present invention, wherein, $S_{T1}$ and $S_{T2}$ respectively represent trigger signals of the main switch transistor T1 and the clamp switch transistor T2, $i_m$ represents a waveform of the magnetizing current, $i_1$ represents a primary current waveform, $i_s$ represents a resonant current flowing through the resonant inductor Ls, $U_{T1}$ and $i_{T1}$ respectively represent a voltage and a current waveform of the main switch transistor T1, $U_{T2}$ and $i_{T2}$ respectively represent a voltage and a current waveform of the clamp switch transistor T1, $U_{D1}$ and $-U_{D2}$ respectively represent voltage waveforms of the first and the second rectifying diodes D1 and D2. When the main switch transistor T1 is on and the clamp switch transistor T2 is off (in forward working state), on the secondary side, the first rectifying diode D1 is on, the second rectifying diode D2 is off, the resonant circuit constituted by the first capacitor C1, the second capacitor C2 and the resonant inductor Ls begins to resonate, half of the resonant current flows through the output capacitor C0, to supply power to the load connected between the first and the second output terminals. Before the main switch transistor T1 is switched off, the resonant period Tr ($=2\pi\sqrt{L_s(C_1+C_2)}$) is completed by half, the resonant current $i_s$ flowing through the resonant inductor Ls turns to be zero, thus, the first rectifying diode D1 is switched off without reverse recovery. When the main switch transistor T1 is off and the clamp switch transistor T2 is on (in flyback working state), the zero-current switching of the second rectifying diode D2 is implemented in the same way.

For the first and the second rectifying diodes D1 and D2, the reverse voltage $V_{RD1}$ of the first rectifying transistor in the flyback working state and the reverse voltage $V_{RD2}$ of the second rectifying diode in the forward working state are respectively:

$$V_{RD1} = V_{0-}(V_{S1} + V_{S2}) = V_0 - V_r\left(\frac{N_{S2}}{N_P} - \frac{N_{S1}}{N_P}\right) \quad (1)$$

$$V_{RD2} = V_0 - (V_{S1} + V_{S2}) = V_0 - V_{in}\left(\frac{N_{S1}}{N_P} - \frac{N_{S2}}{N_P}\right) \quad (2)$$

Where $V_0$ is an output voltage, $V_{S1}$ and $V_{S2}$ are respectively voltages of the forward winding and the flyback winding, $V_{in}$ is an input voltage, Vr is a voltage of the clamp capacitor, $N_P$ is the number of turns of the primary winding of the transformer, $N_{S1}$ and $N_{S2}$ are respectively the number of turns of the forward winding and the flyback winding, and Lr may be omitted since Lm is far greater than Lr.

Figure 1:
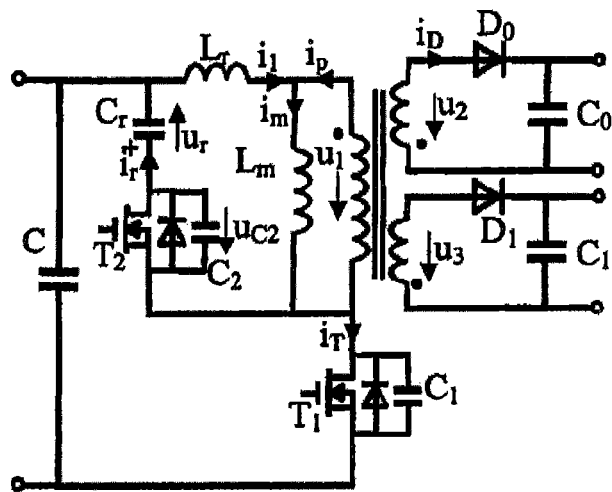
FIG. 1 shows an equivalent circuit diagram of the active-clamped flyback DC-DC converter topology according to the prior art.

It can be seen in formulae (1) and (2) that, if $N_{S1}=N_{S2}$, then $V_{RD1}=V_{RD2}=V_0$. In contrast, in the flyback DC-DC converter topology as shown in FIG. 1, the reverse voltage on the secondary-side rectifying diode is V0+Vin/n, where, n is the turns ratio between the primary winding and the secondary winding. It can be seen by comparison that in the forward-flyback DC-DC converter topology according to the embodiment of the present invention, a rectifying diode of lower voltage rating may be selected.

It may be conceived that further optimization can be made to the converter topology by using the relation between the reverse voltage of the secondary-side rectifying diode and the number of turns of the forward and flyback windings. In a more advantageous embodiment, the converter can be made to transfer different amounts of energy in the forward working state and the flyback working state, according to different secondary-side output voltage. For example, if most of the energy is transferred in the forward working state, since the current flowing through the first rectifying diode D1 will be much greater than the current flowing through the second rectifying diode D2, by setting the number of turns of the secondary winding as $N_{S2}>N_{S1}$, the reverse voltage of the first rectifying diode D1 may be further reduced to be less than V0, so as to further reduce the secondary-side loss by using the diode with smaller reverse withstand voltage (the forward on-state voltage drop is relatively small accordingly) as the first rectifying diode D1. In other words, by adjusting the size relation between the number of turns of the secondary-side forward winding and the number of turns of the flyback winding, the reverse voltage of the secondary-side rectifying diode may be made different, so as to select the most preferable rectifying tube having the most suitable reverse withstand voltage performance, and optimize the efficiency.

It is easy for those skilled in the art to design and select parameters of the high-frequency transformers, inductors, capacitors, and semiconductor switching devices on the basis of the topological structure as shown in FIG. 3, and to design and select a control module, a drive module, a sampling circuit, and other peripheral circuits to produce a forward-flyback DC-DC converter. For example, the control module of the DC-DC converter may utilize a PWM modulation dedicated chip, into which an oscillator, an error comparator, a PWM modulator, a driving circuit and/or protection circuit are integrated. A stable and simply-controlled switching power supply may be constituted just by an integrated chip plus a few circuits. Since the design of the control chip and the peripheral components belongs to the common knowledge of those skilled in the art, detailed description thereof will be omitted here.

Figure 6:
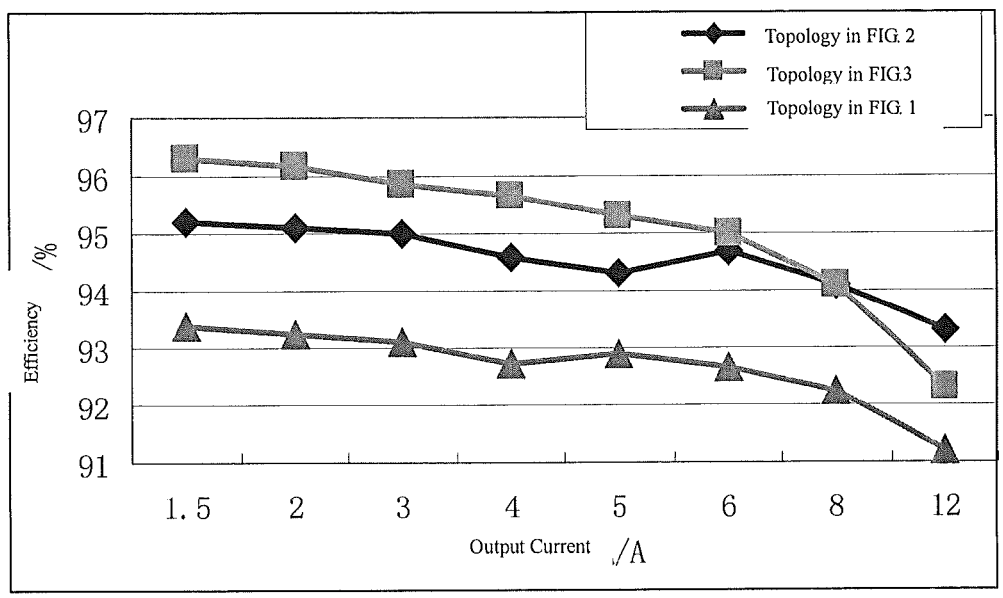
FIG. 6 is a curve diagram showing the efficiency comparison among the three topologies in FIGS. 1, 2 and 3 in the case of change of the output current.

Those skilled in the art can clearly understand that, by using the forward-flyback DC-DC converter topology according to the embodiment of the present invention, the zero-current switching of the secondary-side rectifying diodes D1 and D2 is implemented and both the secondary-side loss and electromagnetic interference emission are reduced via the secondary-side resonant circuit; meanwhile, because the forward-flyback topology has a lower peak current on the primary side, the conduction loss of the primary-side semiconductor device may be reduced thereby. With the above factors taken together, the forward-flyback DC-DC converter topology according to the embodiments of the present invention has a higher efficiency than that of a flyback topology, and can meet the requirement for the fan-off application scenario. Meanwhile, because the reverse voltage of the secondary-side rectifying diode is relatively low, a device of lower rating may be selected so as to reduce cost. Efficiency comparison between the two topologies under test conditions that the input voltage Vin=360V DC, the output power P0=480 W, the output voltage V0=40, 60, 80, 96, 120, 160, 240, 320V DC is shown in FIG. 6. It can be seen in FIG. 6 that the efficiency can be improved by up to 3%. In addition, it may be noted that, the lower the output current (the higher the output voltage), the higher the efficiency of the forward-flyback DC-DC converter topology according to the embodiment of the present invention. Therefore, the topology disclosed in the present invention is especially suitable for the application scenario of high output voltage.

Table 1 shows an instance in which a secondary-side diode is selected when P0=480 W. As shown in Table 1, a suitable secondary-side rectifying diode may be selected as the output voltage varies, wherein, the diode having repetitive reverse peak voltage (VRRM) parameters of 200, 400, 600 and 800V is selected for the flyback topology as shown in FIG. 1, the diode having reverse peak voltage (VRRM) parameters of 100, 200 and 400 is selected for the topology according to the present invention as shown in FIG. 3, to meet the requirement for different maximum reverse voltage (Max.Rev.Vol.).

Figure 2:
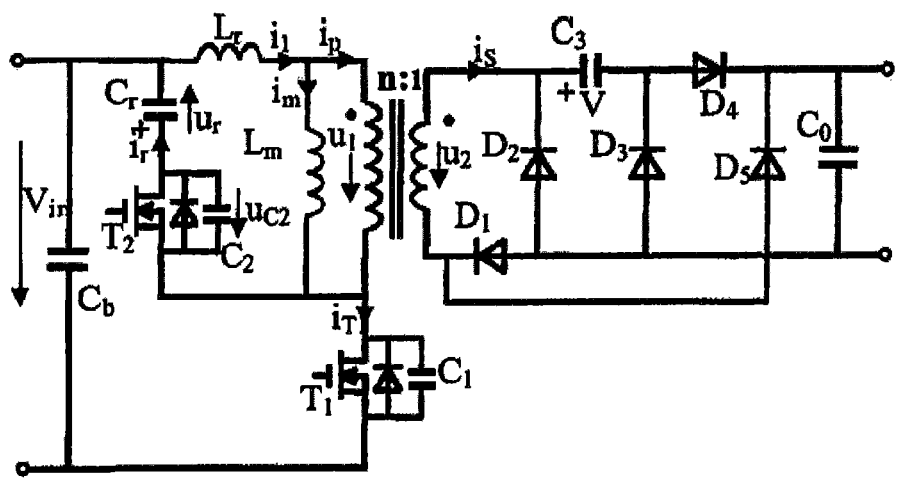
FIG. 2 shows an equivalent circuit diagram of the active-clamped forward-flyback DC-DC converter topology according to the prior art.

In order to facilitate comparison, the cases of the forward-flyback converter topology in the prior art as shown in FIG. 2 are also shown in FIG. 6 and Table 1. In such topology, because most of the current flows through D1 and D4 and the current in D2, D3 and D5 is relatively small, the loss in D2, D3 and D5 can be omitted by comparison, and only the selections of D1 and D4 are listed in Table 1. It can be seen in FIG. 6 and Table 1 that the topology according to the embodiments of the present invention has an approximate cost but a higher efficiency as compared with the topology shown in FIG. 2.

Figure 7:
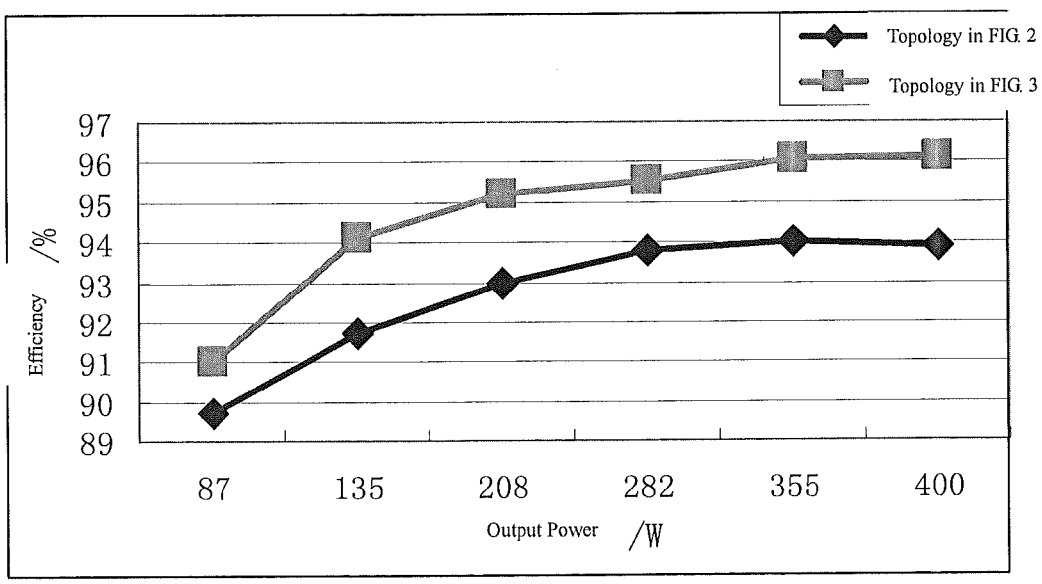
FIG. 7 is a curve diagram showing the efficiency comparison between the two topologies in FIG. 2 and FIG. 3 in the case of load variation.

FIG. 7 shows the efficiency comparison between the two forward-flyback converter topologies as shown in FIG. 2 and FIG. 3 in the case of load variation (test conditions: input voltage Vin=360V DC, output voltage V0=275V DC). It can be seen that, within the variation range from light load to heavy load, the topology according to the embodiment of the present invention maintains high efficiency, and, the efficiency increases with the output power, even up to 96% or more.

TABLE 1

Selection of Secondary-side Diode Varying with V0 (P0 = 480 W)

| Topology | | 1.5 | 2 | 3 | 4 | 5 | 6 | 8 | 12 |
|---|---|---|---|---|---|---|---|---|---|
| | Output Current/A | 1.5 | 2 | 3 | 4 | 5 | 6 | 8 | 12 |
| | Output Voltage/V | 320 | 240 | 160 | 120 | 96 | 80 | 60 | 40 |
| Topology of FIG. 1 (D0) | Max. Rev. Vol./V | 720 | 544 | 368 | 264 | 224 | 176 | 140 | 88 |
| | $V_{RRM}$/V | 800 | | 600 | | 400 | | 200 | |
| | Forward Voltage | Vf = 1.5 V | | Vf = 1.2 V | | Vf = 0.9 V | | Vf = 0.7 V | |
| Topology of FIG. 3 (D1/D2) | Max. Rev. Vol./V | 320 | 240 | 160 | 120 | 96 | 80 | 60 | 40 |
| | $V_{RRM}$/V | 400 | | | | 200 | | 100 | |
| | Forward Voltage | Vf = 0.9 V | | | | Vf = 0.7 V | | Vf = 0.5 V | |
| Topology of FIG. 2 (D1/D4) | Max. Rev. Vol./V | 320 | 240 | 160 | 120 | 96 | 80 | 60 | 40 |
| | $V_{RRM}$/V | 400 | | | | 200 | | 100 | |
| | Forward Voltage | Vf = 0.9 V | | | | Vf = 0.7 V | | Vf = 0.5 V | |

When the switching power supply is formed by using the converter topology proposed by the present invention, in order to further reduce cost, it may be considered to use a fixed frequency control chip, for example, by using UC3842 as a PWM control chip, a cost-effective solution can be obtained with only a few external components. However, the limitations of the solution are that: the secondary-side resonant circuit cannot operate with high efficiency in a very wide input range, and in order to implement high efficiency, the duty cycle is usually within a range of 0.4 to 0.6, which restricts the input voltage at full load. However, in the case of the application scenario of the Super Charger, since the input voltage range at full load thereof is not wide, the above solution can meet the requirements of the input voltage range while achieving operation at high-efficiency. Therefore, a combination of the topology according to the embodiment of the present invention and the fixed frequency IC is preferably used to constitute the Super Charger of high efficiency and low cost.

First Variant

Figure 8:
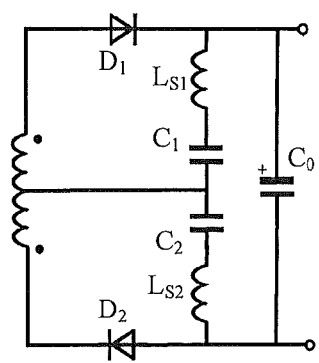
FIG. 8 shows a first variant of the secondary-side resonant circuit.

FIG. 8 shows the first variant applied to a resonant circuit of the forward-flyback DC-DC converter topology according to the embodiment of the present invention, wherein the resonant circuit adopted is in a form different from that as shown in FIG. 3, to implement the zero-current switching of the secondary-side rectifying diode. As shown in FIG. 8, the resonant circuit includes a first inductor $L_{S1}$, a second inductor $L_{S2}$, a first capacitor $C_1$ and a second capacitor $C_2$. The first inductor $L_{S1}$ and the first capacitor $C_1$ are connected in series between a first output terminal and an unlike terminal of the forward winding and the flyback winding, the second inductor $L_{S2}$ and the second capacitor $C_2$ are connected in series between a second output terminal and the unlike terminal of the forward winding and the flyback winding.

Second Variant

Figure 9:
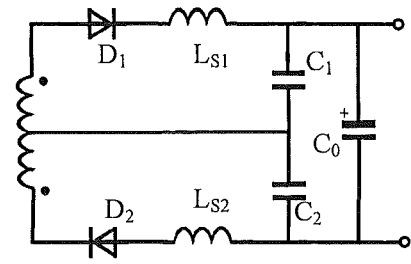
FIG. 9 shows a second variant of the secondary-side resonant circuit.

FIG. 9 shows the second variant applied to a resonant circuit of the forward-flyback DC-DC converter topology according to the embodiment of the present invention, wherein the resonant circuit adopted is in a form different from those as shown in FIG. 3 and FIG. 8, to implement the zero-current switching of the secondary-side rectifying diode. As shown in FIG. 9, the resonant circuit includes the first inductor $L_{S1}$, the second inductor $L_{S2}$, the first capacitor $C_1$ and the second capacitor $C_2$. The first inductor $L_{S1}$ is connected between the first rectifying switch diode D1 and the first output terminal, the second inductor $L_{S2}$ is connected between the second rectifying switch diode D2 and the second output terminal, the first capacitor $C_1$ and the second capacitor $C_2$ are connected in series between the first output terminal and the second output terminal, the unlike terminal of the forward winding and the flyback winding is connected to the intermediate node of the first capacitor $C_1$ and the second capacitor $C_2$.

Figure 4:
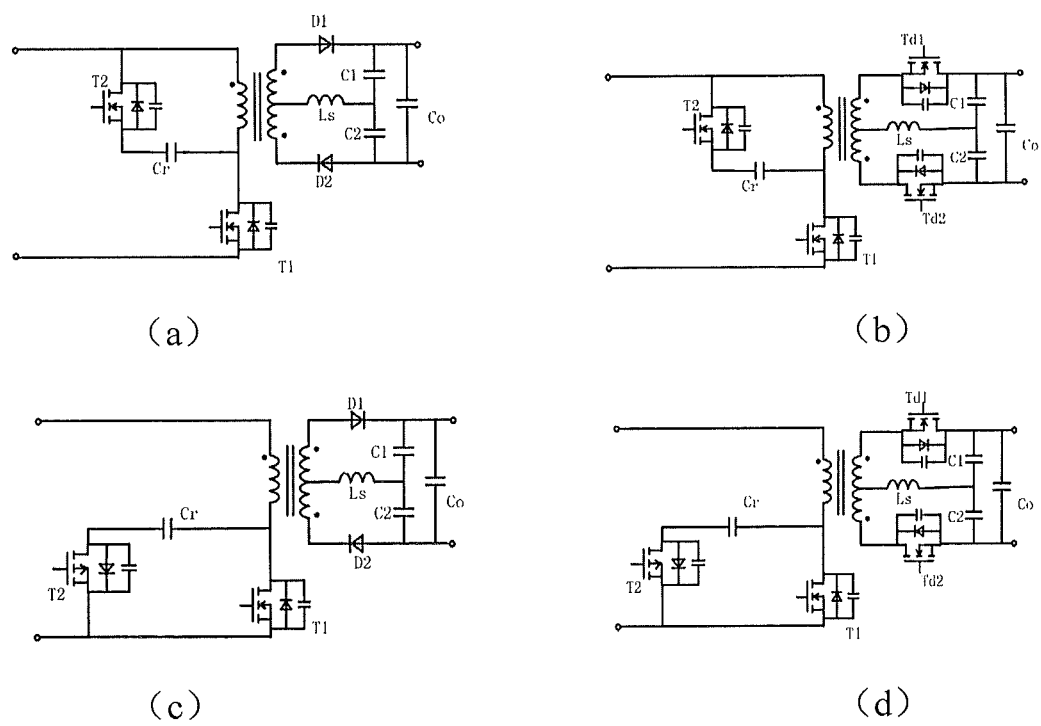
FIGS. 4(a)-(d) show a set of exemplary active-clamped forward-flyback DC-DC converter topological structures according to the embodiment of the present invention.

Without departing from the general inventive concept of the present invention, those skilled in the art may think of using other LC resonant circuit to implement the zero-current switching of the secondary-side rectifying diode and of combining it with the exemplary topological structure as shown in FIG. 4 and other similar topological structure freely, for example, using a resonant circuit having an equivalent circuit same as that of the resonant circuits as shown in FIG. 3, FIG. 8 and FIG. 9.

Although the present invention is described by specific embodiments and drawings, the scope of the present invention is not restricted to these specific details. Those skilled in the art will clearly understand that various modifications, substitutions and variations may be made to these details without departing from the spirit and scope of the general inventive concept of the present invention. Therefore, the present invention is not limited to these specific details, exemplary structures and connection manners in a broader sense of embodiment, and the scope thereof is given by the attached claims and their equivalents.

What is claimed is:

1. A forward-flyback DC-DC converter comprising: a transformer, a main switch, a clamp circuit, first and second rectifying switches, an LC resonant circuit and an output capacitor, wherein a primary winding of the transformer and the main switch are connected in series between a first input terminal and a second input terminal, the clamp circuit constituted by a clamp capacitor and a clamp switch connected in series is connected in parallel with the primary winding or with the main switch, a secondary winding of the transformer comprises a forward winding and a flyback winding, a dotted terminal of the forward winding being connected with a first output terminal via the first rectifying switch, a dotted terminal of the flyback winding being connected with a second output terminal via the second rectifying switch, the LC resonant circuit being connected to the first output terminal, the second output terminal and a connection node where undotted terminals of the forward winding and the flyback winding are joined together so that the first and the second rectifying switches implement zero-current switching, and an output capacitor being connected between the first output terminal and the second output terminal.

2. The forward-flyback DC-DC converter according to claim 1, wherein the LC resonant circuit comprises a first capacitor, a second capacitor and a resonant inductor, the first capacitor and the second capacitor being connected in series between the first output terminal and the second output terminal, a first terminal of the resonant inductor being connected to the connection node where the undotted terminals of the forward winding and the flyback winding are joined together and a second terminal of the resonant inductor being connected to an intermediate node between the first capacitor and the second capacitor.

3. The forward-flyback DC-DC converter according to claim 1, wherein the LC resonant circuit comprises a first inductor, a second inductor, a first capacitor and a second capacitor, the first inductor and the first capacitor being connected in series between the first output terminal and the connection node where the undotted terminals of the forward winding and the flyback winding are joined together, the second inductor and the second capacitor being connected in series between the second output terminal and the connection node where the undotted terminals of the forward winding and the flyback winding are joined together.

4. The forward-flyback DC-DC converter according to claim 1, wherein the LC resonant circuit comprises a first inductor, a second inductor, a first capacitor and a second capacitor, the first inductor being connected between the first rectifying switch and the first output terminal, the second inductor being connected between the second rectifying switch and the second output terminal, the first capacitor and the second capacitor being connected in series between the first output terminal and the second output terminal, and the connection node where the undotted terminals of the forward winding and the flyback winding are joined together being connected to an intermediate node between the first capacitor and the second capacitor.

5. The forward-flyback DC-DC converter according to claim 1, wherein a turns ratio between the forward winding and the flyback winding is 1:1.

6. The forward-flyback DC-DC converter according to claim 1, wherein on condition that a DC-DC power transmission of the converter in a forward working state is greater than a DC-DC power transmission in a flyback working state, the number of turns of the flyback winding is made greater than the number of turns of the forward winding, and on condition that the DC-DC power transmission of the converter in the flyback working state is greater than the DC-DC power transmission in the forward working state, the number of turns of the forward winding is made greater than the number of turns of the flyback winding.

7. The forward-flyback DC-DC converter according to claim 1, wherein the first and second rectifying are diodes or MOSFETs.

8. The forward-flyback DC-DC converter according to claim 1, wherein, when entering the forward working state with the main switch on and the clamp switch off, the first rectifying switch is on, the second rectifying switch is off, the LC resonant circuit begins to resonate, and resonance current flowing through the LC resonant circuit is made to zero before the main switch is switched off, to implement the zero-current switching of the first rectifying switch; and wherein, when entering the flyback working state with the main switch off and the clamp switch on, the first rectifying switch is off, the second rectifying switch is on, the LC resonant circuit begins to resonate, and the resonance current flowing through the LC resonant circuit is made to zero before the main switch is switched on, to implement the zero-current switching of the second rectifying switch.

9. The forward-flyback DC-DC converter according to claim 1, wherein, when the main switch is off, the clamp capacitor and the leakage inductance of the transformer resonate, so that the main switch and the clamp switch acquire zero-voltage switching, and energy of the leakage inductance of the transformer is transferred to the secondary side via resonance, to avoid energy loss of the leakage inductance of the transformer and instantly-caused voltage spike on the main switch.

10. The DC-DC converter according to claim 1, wherein the first and second rectifying switches are diodes or MOSFETs.

11. A DC-DC converter comprising:
a transformer;
a main switch coupled in series with a primary winding of the transformer between a first input terminal and a second input terminal;
a clamp circuit comprising a series-connected combination of a clamp capacitor and a clamp switch connected in parallel with the primary winding or in parallel with the main switch;
first and second rectifying switches coupled to a secondary winding of the transformer comprising a forward winding and a flyback winding, a first terminal of the forward winding being connected to a first output terminal via the first rectifying switch, a first terminal of the flyback winding being connected with a second output terminal via the second rectifying switch;
an LC resonant circuit connected to the first output terminal, the second output terminal and a connection node where second terminals of the forward winding and the flyback winding are joined together; and
an output capacitor connected between the first output terminal and the second output terminal
wherein the second terminals of the forward winding and the flyback winding are undotted terminals.

12. The DC-DC converter according to claim 11, wherein the LC resonant circuit comprises:
first and second capacitors coupled in series between the first output terminal and the second output terminal; and
an inductor coupled between the connection node where the second terminals of the forward and flyback windings are joined together and an intermediate node between the first capacitor and the second capacitor.

13. The DC-DC converter according to claim 11, wherein the LC resonant circuit comprises:
a first inductor and a first capacitor coupled in series between the first output terminal and the connection node where the second terminals of the forward and flyback windings are joined together; and
a second inductor and a second capacitor coupled in series between the second output terminal and the connection node where the second terminals of the forward and flyback windings are joined together.

14. The DC-DC converter according to claim 11, wherein the LC resonant circuit comprises:
a first inductor coupled between the first rectifying switch and the first output terminal;
a second inductor coupled between the second rectifying switch and the second output terminal; and
first and second capacitors coupled in series between the first and second output terminals.

15. The DC-DC converter according to claim 11, wherein the LC resonant circuit is configured to implement zero-current switching of the first and second rectifying switches.

\* \* \* \* \*